(12) United States Patent
Teraoka (10) Patent No.: US 9,671,593 B2
(45) Date of Patent: Jun. 6, 2017

(54) IMAGING LENS ASSEMBLY (71) Applicant: Hiroyuki Teraoka, Kyoto (JP)

(72) Inventor: Hiroyuki Teraoka, Kyoto (JP)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/225,333

(22) Filed: Aug. 1, 2016

(65) Prior Publication Data
US 2017/0090159 A1    Mar. 30, 2017

(30) Foreign Application Priority Data

Sep. 28, 2015  (JP) ................................. 2015-189871
Apr. 30, 2016  (CN) ............................ 201610279377

(51) Int. Cl.
*G02B 3/02* (2006.01)
*G02B 13/00* (2006.01)
*G02B 5/00* (2006.01)
*G02B 9/62* (2006.01)

(52) U.S. Cl.
CPC ......... *G02B 13/0045* (2013.01); *G02B 5/005* (2013.01); *G02B 9/62* (2013.01)

(58) Field of Classification Search
CPC .................................................. G02B 13/0045
USPC .......................................................... 359/713
See application file for complete search history.

(56) References Cited

U.S. PATENT DOCUMENTS

2016/0004044 A1*  1/2016  Kubota .............. G02B 13/0045
                                                        359/713

* cited by examiner

*Primary Examiner* — James Jones
(74) *Attorney, Agent, or Firm* — Na Xu; IPro, PLLC (57) ABSTRACT

An imaging lens assembly is provided in the present disclosure. The imaging lens assembly includes a first lens with positive refractive power; a second lens with negative refractive power; a third lens with negative refractive power; a fourth lens with positive refractive power; a fifth lens with positive refractive power; and a sixth lens with negative refractive power. The first lens, the second lens, the third lens, the fourth lens, the fifth lens and the sixth lens are arranged in sequence from the object side to the image side, and satisfy conditions provided in the present disclosure.

2 Claims, 5 Drawing Sheets

IMAGING LENS ASSEMBLY

FIELD OF THE DISCLOSURE

The present disclosure relates to optical technologies, and more particular, to an imaging lens assembly applicable to a digital camera of a mobile phone or a WEB camera, which uses CCD imaging components or CMOS imaging components with high resolution.

BACKGROUND

CCD imaging components and CMOS imaging components are used widely in camera device, to meet the requirements of miniaturization and good performance of the imaging components, a wide-angle lens assembly with good optical characteristic, thin profile, and high luminous flux (namely, F number) is needed.

Japanese patent No. 5651881 discloses an imaging lens assembly including six lenses. However, the proportion of the total track length (TTL) and the image height (IH) of the imaging lens assembly is greater than 1.464; this is, TTL/IH≥1.464. Accordingly, the imaging lens assembly is too thick to meet the miniaturization requirement.

Accordingly, an improved imaging lens assembly which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present invention will hereinafter be described in detail with reference to several embodiments.

Figure 1:
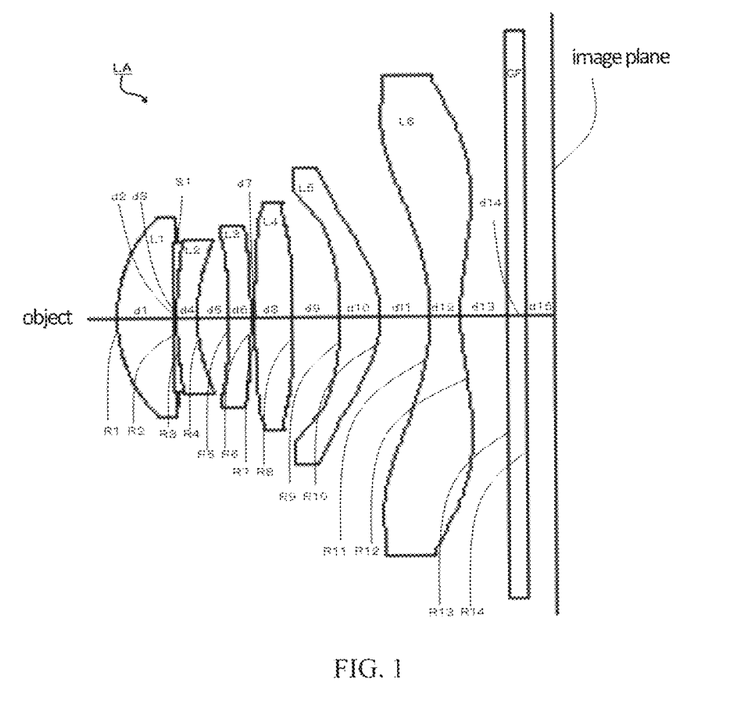
FIG. 1 is a structural diagram of an imaging lens assembly related to an embodiment of the present disclosure.

Referring to FIG. 1, an imaging lens assembly LA according to an embodiment of the present disclosure is shown. The imaging lens assembly LA includes a lens set with six lenses, that is, a first lens L1, a second lens L2, a third lens L3, a fourth lens L4, a fifth lens L5 and a sixth lens L6, which are arranged in that order from the object side to the image plane. A glass filter GF is arranged between the sixth lens L6 and the image plane, the glass filter GF may be a cover glass or an IR filter. Alternatively, the glass filter GF may be arranged in other location or even removed from the imaging lens assembly LA.

The first lens L1 has a positive refractive power, the second lens L2 has a negative refractive power, the third lens L3 also has a negative refractive power, the fourth lens L4 has a positive refractive power, the fifth lens L5 has a positive refractive power, and the sixth lens L6 has a negative refractive power. In practice, the six lenses L1 to L6 may be designed to have aspheric surfaces, so as to compensate aberration in the imaging lens assembly LA.

The imaging lens assembly LA satisfies the following conditions (1) to (5):

$$0.74 \leq f1/f \leq 0.85 \tag{1}$$

$$-10.00 \leq f3/f \leq -5.00 \tag{2}$$

$$0.50 \leq f5/f \leq 0.85 \tag{3}$$

$$2.20 \leq (R3+R4)/(R3-R4) \leq 5.00 \tag{4}$$

$$-7.00 \leq (R5+R6)/(R5-R6) \leq -2.00 \tag{5}$$

In the above conditions (1) to (5),
f is the focal length of the imaging lens assembly;
f1 is the focal length of the first lens L1;
f3 is the focal length of the third lens L3;
f5 is the focal length of the fifth lens L5;
R3 is the curvature radius of the object side of the second lens L2;
R4 is the curvature radius of the image side of the second lens L2;
R5 is the curvature radius of the object side of the third lens L3; and
R6 is the curvature radius of the image side of the third lens L3.

The condition (1) defines the positive refractive power of the first lens L1. If the proportion value f1/f is less than the minimum limit of condition (1), it may be good for the miniaturization of the imaging lens assembly LA; however, the positive refractive power of the first lens L1 may be too strong to compensate aberration. In contrast, when the proportion value f1/f exceeds the maximum limit of condition (1), the positive refractive power of the first lens L1 is too weak, and is adverse to the miniaturization of the imaging lens assembly LA.

The condition (2) defines the negative refractive power of the third lens L3. If the proportion value f3/f is beyond the value range defined by condition (2), it is difficult to compensate high order aberration such as the spherical aberration when the imaging lens assembly LA has a less thickness and a wider view angle with an F number (Fno) less than 2.2.

The condition (3) defines the positive refractive power of the fifth lens L5. If the proportion value f5/f is beyond the value range defined by condition (3), it is difficult to compensate the on-axis chromatic aberration when the imaging lens assembly LA has a less thickness and a wider view angle with an F number (Fno) less than 2.2.

In addition, the proportion value f5/f in condition (3) is preferred to be set in the value range as defined in the following condition (3-A):

$$0.60 \leq f5/f \leq 0.80 \tag{3-A}$$

The condition (4) defines the shape of the second lens L2. If the proportion value (R3+R4)/(R3−R4) is beyond the value range defined by condition (4), it is difficult to compensate the on-axis chromatic aberration when the imaging lens assembly LA has a less thickness and a wider view angle with an F number (Fno) less than 2.2.

The condition (5) defines the shape of the third lens L3. If the proportion value (R5+R6)/(R5−R6) is beyond the value range defined by condition (5), it is difficult to compensate the lateral color when the imaging lens assembly LA has a less thickness and a wider view angle with an F number (Fno) less than 2.2.

In the imaging lens assembly LA, an aperture stop S1 is located between the first lens L1 and the second lens L2, which satisfies the following condition (6):

$$-5.00 \leq d2/d3 \leq -1.00 \quad (6)$$

In the above condition (6),
d2: the axial distance between the image side of the first lens L1 and the aperture stop S1; and
d3: the axial distance between the aperture stop S1 to the object side of the second lens L2.

The condition (6) defines the location of the aperture stop S1. If the proportion value d2/d3 is beyond the value range defined by condition (6), it is difficult for the imaging lens assembly LA to have a less thickness and a wider view angle with an F number (Fno) less than 2.2.

In addition, the proportion value d2/d3 in condition (6) is preferred to be set in the value range as defined in the following condition (6-A):

$$-3.50 \leq d2/d3 \leq -2.00 \quad (6\text{-A})$$

Upon the condition that the six lenses L1 to L6 satisfy the aforesaid conditions, the imaging lens assembly LA is possible to have good optical characteristic as well as an ultra-thin profile, and moreover, the imaging lens assembly LA may also satisfy the following parameter requirements: TTL/IH≤1.45, view angle 2ω>76°, and Fno≤2.2.

The following description describes the imaging lens assembly LA according to the present disclosure in detail with reference to several embodiments; parameters of the imaging lens assembly LA are defined as follows, in which the unit of each of distance, radius, and central thickness is millimeter (mm):
f: the focal length of the imaging lens assembly LA;
f1: the focal length of the first lens L1;
f2: the focal length of the second lens L2;
f3: the focal length of the third lens L3;
f4: the focal length of the fourth lens L4;
f5: the focal length of the fifth lens L5;
f6: the focal length of the sixth lens L6;
Fno: F-number;
2ω: full view angle;
S1: the aperture stop;
R: a curvature radius of an optical surface, and may also be a central curvature radius of a lens;
R1: the curvature radius of the object side of the first lens L1;
R2: the curvature radius of the image side of the first lens L1;
R3: the curvature radius of the object side of the second lens L2;
R4: the curvature radius of the image side of the second lens L2;
R5: the curvature radius of the object side of the third lens L3;
R6: the curvature radius of the image side of the third lens L3;
R7: the curvature radius of the object side of the fourth lens L4;
R8: the curvature radius of the image side of the fourth lens L4;
R9: the curvature radius of the object side of the fifth lens L5;
R10: the curvature radius of the image side of the fifth lens L5;
R11: the curvature radius of the object side of the sixth lens L6;
R12: the curvature radius of the image side of the sixth lens L6;
R13: the curvature radius of the object side of the glass filter GF;
R14: the curvature radius of the image side of the glass filter GF;
d: an axial thickness of the lens or an axial distance between lenses;
d1: the central thickness of the first lens L1;
d2: the axial distance between the image side of the first lens L1 and the aperture stop S1;
d3: the axial distance between the aperture stop S1 to the object side of the second lens L2;
d4: the central thickness of the second lens L2;
d5: the axial distance between the image side of the second lens L2 and the object side of the third lens L3;
d6: the central thickness of the third lens L3;
d7: the axial distance between the image side of the third lens L3 and the object side of the fourth lens L4;
d8: the central thickness of the fourth lens L4;
d9: the axial distance between the image side of the fourth lens L4 and the object side of the fifth lens L5;
d10: the central thickness of the fifth lens L5;
d11: the axial distance between the image side of the fifth lens L5 and the object side of the sixth lens L6;
d12: the central thickness of the sixth lens L6;
d13: the axial distance between the image side of the sixth lens L6 and the object side of the glass filter GF;
d14: the central thickness of the glass filter GF;
d15: the axial distance between the image side of the glass filter GF and the image plane;
nd: d line refraction index;
nd1: d line refraction index of the first lens L1;
nd2: d line refraction index of the second lens L2;
nd3: d line refraction index of the third lens L3;
nd4: d line refraction index of the fourth lens L4;
nd5: d line refraction index of the fifth lens L5;
nd6: d line refraction index of the sixth lens L6;
nd7: d line refraction index of the glass filter GF;
υd: abbe number (i.e., dispersion coefficient)
υ1: abbe number of the first lens L1;
υ2: abbe number of the second lens L2;
υ3: abbe number of the third lens L3;
υ4: abbe number of the fourth lens L4;
υ5: abbe number of the fifth lens L5;
υ6: abbe number of the sixth lens L6;
υ7: abbe number of the glass plate GF;
TTL: the total track length (i.e., an axial distance between the object side of the first lens L1 and the image plane);
LB: the axial distance between the image side of the sixth lens L6 and the image plane (including the thickness of the glass plate GF); and
IH: the image height.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (7)$$

In the above condition (7), R is then axial curvature radius, k is the conic coefficient, and A4, A6, A8, A10, A12, A14 and A16 are aspherical coefficients.

Optionally, aspherical surfaces of the lenses L1-L6 may be obtained according to condition (7); alternatively, the aspherical surfaces may also be obtained according to other conditions.

EMBODIMENT 1

Figure 2:
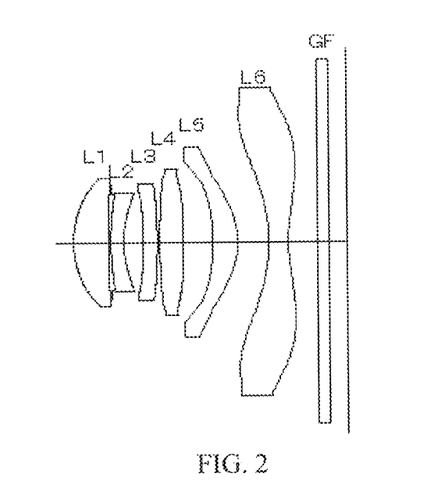
FIG. 2 is a structural diagram of the imaging lens assembly in accordance with the first embodiment of the present disclosure.

FIG. 2 illustrated an imaging lens assembly LA in accordance with the first embodiment of the present disclosure. TABLE 1 and TABLE 2 show the detailed optical data of the imaging lens assembly LA.

The optical data in TABLE 1 includes the curvature radius R, the axial thickness d, the axial distance d between lenses, refraction index nd and abbe number d of the lenses L1 to L6 in the imaging lens assembly LA. The optical data in TABLE 2 includes conic coefficient (C-coefficient) k and aspherical coefficient of the lenses L1 to L6 in the imaging lens assembly LA.

TABLE 1

|  | R | d |  | nd |  | vd |
|---|---|---|---|---|---|---|
| R1 | 1.72159 | d1 = | 0.620 | nd1 | 1.5441 | v1 56.12 |
| R2 | 71.02847 | d2 = | 0.060 |  |  |  |
| S1 | ∞ | d3 = | −0.020 |  |  |  |
| R3 | 3.92712 | d4 = | 0.228 | nd2 | 1.6422 | v2 22.41 |
| R4 | 1.83550 | d5 = | 0.346 |  |  |  |
| R5 | −8.84230 | d6 = | 0.246 | nd3 | 1.6422 | v3 22.41 |
| R6 | −15.27560 | d7 = | 0.040 |  |  |  |
| R7 | 5.63452 | d8 = | 0.420 | nd4 | 1.5441 | v4 56.12 |
| R8 | 140.74735 | d9 = | 0.530 |  |  |  |
| R9 | −3.99474 | d10 = | 0.445 | nd5 | 1.5441 | v5 56.12 |
| R10 | −1.25225 | d11 = | 0.554 |  |  |  |
| R11 | −2.85122 | d12 = | 0.334 | nd6 | 1.5441 | v6 56.12 |
| R12 | 2.39500 | d13 = | 0.520 |  |  |  |
| R13 | ∞ | d14 = | 0.210 | nd7 | 1.5168 | v6 64.17 |
| R14 | ∞ | d15 = | 0.314 |  |  |  |

TABLE 2

| | C-coefficient | aspherical coefficient | | | | | | |
|---|---|---|---|---|---|---|---|---|
| | k | A4 | A6 | A8 | A10 | A12 | A14 | A16 |
| R1 | −3.3637E−01 | 9.1793E−00 | 1.7164E−02 | −9.3187E−03 | 2.1332E−03 | 4.9063E−03 | 3.7922E−03 | −3.5888E−03 |
| R2 | 0.0000E+00 | 2.2740E−02 | −3.0115E−04 | 6.5366E−03 | 7.0258E−03 | 4.1162E−03 | −4.6933E−02 | 3.0938E−02 |
| R3 | −2.7972E+01 | −2.3667E−02 | 1.3978E−02 | 1.7396E−02 | 3.9083E−04 | −9.1412E−03 | −5.9181E−02 | 4.2663E−02 |
| R4 | −4.1187E+00 | −1.3860E−02 | 1.6146E−02 | 3.2665E−02 | −2.8300E−02 | −2.3006E−02 | −3.0069E−02 | 7.5740E−02 |
| R5 | 2.7714E+01 | 1.5736E−02 | −8.7051E−02 | −1.0675E−02 | 4.0861E−02 | −2.7237E−03 | −8.3373E−02 | 1.2361E−01 |
| R6 | 6.6865E+01 | −6.7875E−03 | −4.0656E−02 | −2.0513E−03 | 1.4465E−02 | 7.4632E−03 | 3.2446E−03 | 4.7301E−03 |
| R7 | 0.0000E+00 | −7.9496E−02 | 2.3401E−02 | 9.9228E−03 | 1.8051E−03 | 1.7226E−03 | −7.0958E−04 | −4.3464E−04 |
| R8 | 0.0000E+00 | −6.3073E−02 | −6.4531E−03 | 7.5553E−04 | 5.1209E−04 | 2.2629E−03 | 1.5513E−03 | −2.6950E−04 |
| R9 | 4.7322E+00 | −2.6112E−02 | −8.8108E−03 | 5.3666E−03 | −6.9013E−03 | −9.1214E−04 | 6.0457E−04 | 4.8530E−04 |
| R10 | −3.2712E+00 | −5.3838E−02 | 2.7353E−02 | −1.3985E−03 | 2.8423E−04 | −2.0590E−04 | −6.1255E−05 | 1.4665E−05 |
| R11 | 0.0000E+00 | 2.8570E−03 | 4.8494E−03 | 6.8983E−05 | −6.3440E−05 | −8.7363E−07 | 5.3649E−07 | 1.0178E−08 |
| R12 | −1.9241E+01 | −3.3780E−02 | 7.2008E−03 | −1.3390E−03 | 9.6421E−05 | 2.0207E−06 | −1.4674E−07 | −1.7274E−08 |

The relevant optical data of the imaging lens assembly LA in the first embodiment and the values defined in the aforesaid conditions (1) to (6) are shown in TABLE 5 as provided in the subsequent paragraphs.

As can be seen in TABLE 5, the imaging lens assembly LA in the first embodiment satisfies the aforesaid conditions (1) to (6).

Figure 3:
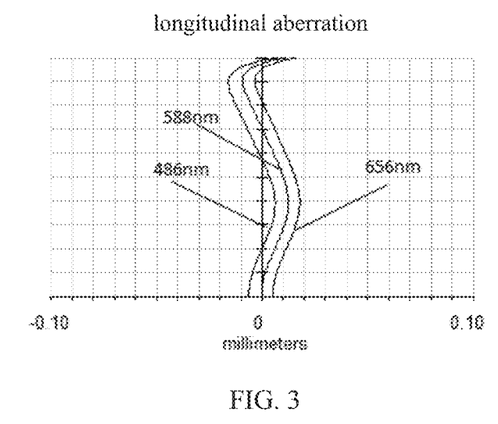
FIG. 3 is the longitudinal aberration of the imaging lens assembly of FIG. 2.
Figure 4:
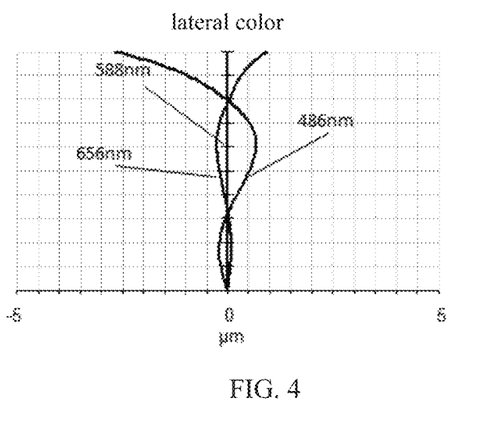
FIG. 4 is the lateral color of the imaging lens assembly of FIG. 2.
Figure 5:
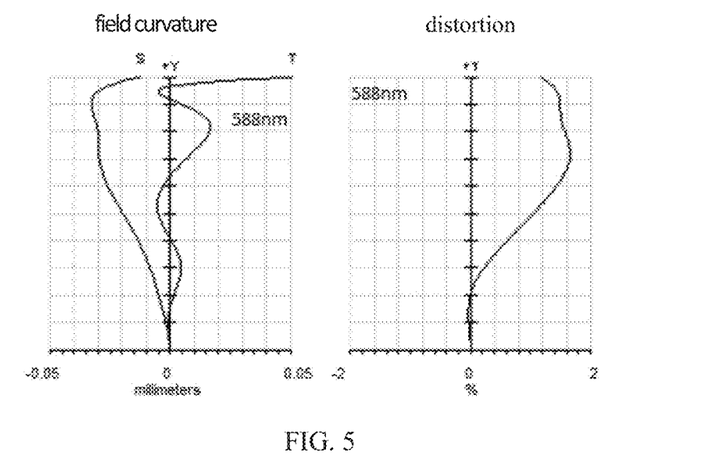
FIG. 5 is the field curvature and distortion of the imaging lens assembly of FIG. 2.

FIGS. 3-5 schematically illustrate the longitudinal aberration, the lateral color, the field curvature and distortion of the imaging lens assembly LA as provided in the first embodiment respectively. In FIG. 5, curve S represents the field curvature related to the sagittal plane, and curve T represents the field curvature related to the tangential plane.

As can be seen, in the first exemplified embodiment, the view angle 2ω of the imaging lens assembly LA is 79.7°, the proportion value TTL/IH of the imaging lens assembly LA is 1.414, and the F number is 2.05. In other words, the imaging lens assembly LA as provided in the first embodiment has an ultrathin profile and a wide view angle with high luminous flux, and accordingly has good optical characteristics.

EMBODIMENT 2

Figure 6:
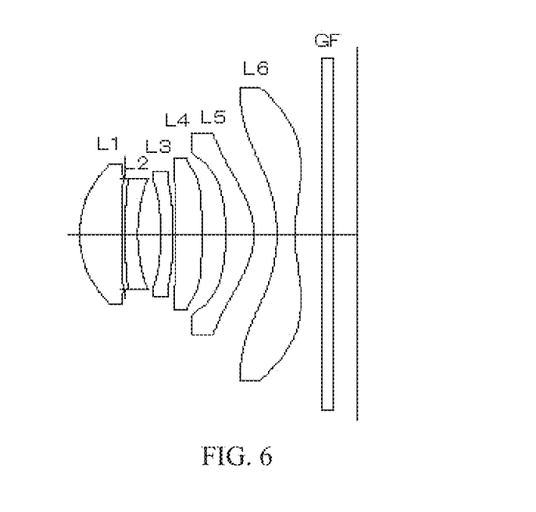
FIG. 6 is a structural diagram of the imaging lens assembly in accordance with the second embodiment of the present disclosure.

FIG. 6 illustrated an imaging lens assembly LA in accordance with the second embodiment of the present disclosure. TABLE 3 and TABLE 4 show the detailed optical data of the imaging lens assembly LA.

The optical data in TABLE 3 includes the curvature radius R, the axial thickness d, the axial distance d between lenses, refraction index nd and abbe number υd of the lenses L1 to L6 in the imaging lens assembly LA. The optical data in TABLE 4 includes conic coefficient (C-coefficient) k and aspherical coefficient of the lenses L1 to L6 in the imaging lens assembly LA.

TABLE 3

|  | R | d |  | nd |  | vd |
|---|---|---|---|---|---|---|
| R1 | 1.71130 | d1 = | 0.622 | nd1 | 1.5441 | v1 56.12 |
| R2 | 57.89791 | d2 = | 0.060 |  |  |  |
| S1 | ∞ | d3 = | −0.020 |  |  |  |
| R3 | 3.96440 | d4 = | 0.227 | nd2 | 1.6422 | v2 22.41 |
| R4 | 1.84384 | d5 = | 0.340 |  |  |  |
| R5 | −9.25464 | d6 = | 0.241 | nd3 | 1.6422 | v3 22.41 |
| R6 | −16.74987 | d7 = | 0.045 |  |  |  |
| R7 | 5.55574 | d8 = | 0.423 | nd4 | 1.5441 | v4 56.12 |
| R8 | 104.03081 | d9 = | 0.532 |  |  |  |
| R9 | −4.04669 | d10 = | 0.447 | nd5 | 1.5441 | v5 56.12 |
| R10 | −1.25647 | d11 = | 0.552 |  |  |  |

TABLE 3-continued

|  | R | d |  | nd |  | vd |
|---|---|---|---|---|---|---|
| R11 | −2.85169 | d12 = | 0.329 | nd6 | 1.5441 | v6 56.12 |
| R12 | 2.39787 | d13 = | 0.520 |  |  |  |
| R13 | ∞ | d14 = | 0.210 | nd7 | 1.5168 | v6 64.17 |
| R14 | ∞ | d15 = | 0.312 |  |  |  |

TABLE 4

| C-coefficient | | aspherical coefficient | | | | | | |
|---|---|---|---|---|---|---|---|---|
| | k | A4 | A6 | A8 | A10 | A12 | A14 | A16 |
| R1 | −3.3625E−01 | 9.1091E−03 | 1.7361E−02 | −9.1765E−03 | 2.2134E−03 | 4.9431E−03 | 3.9090E−03 | −3.5595E−03 |
| R2 | 0.0000E+00 | 2.2732E−02 | −1.6588E−04 | 6.7151E−03 | 7.2435E−03 | 4.3379E−03 | −4.6643E−02 | 3.0648E−02 |
| R3 | −2.8177E+01 | −2.3535E−02 | 1.4332E−02 | 1.7817E−02 | 8.0474E−04 | −8.9356E−03 | −5.9408E−02 | 4.1734E−02 |
| R4 | −4.0759E+00 | −1.3388E−02 | 1.6351E−02 | 3.3280E−02 | −2.7640E−02 | −2.2646E−02 | −3.0320E−02 | 7.4572E−02 |
| R5 | 2.7499E+01 | 1.5844E−02 | −8.6915E−02 | −1.1127E−02 | 4.0494E−02 | −2.8408E−03 | −3.2808E−02 | 1.2453E−01 |
| R6 | 5.8979E+01 | −6.4298E−03 | −4.0336E−02 | −1.7880E−03 | 1.4513E−02 | 7.4121E−03 | 3.2674E−03 | 4.9435E−03 |
| R7 | 0.0000E+00 | −7.9304E−02 | 2.3444E−02 | 9.9299E−03 | 1.7954E−03 | 1.6999E−03 | −7.3808E−04 | −4.5710E−04 |
| R8 | 0.0000E+00 | −6.3629E−02 | −6.6525E−03 | 7.6124E−04 | 5.4623E−04 | 2.2670E−03 | 1.5504E−03 | −2.6931E−04 |
| R9 | 4.7544E+00 | −2.7486E−02 | −8.9396E−03 | 5.3531E−03 | −6.8934E−03 | −9.0414E−04 | 6.0999E−04 | 4.8878E−04 |
| R10 | −3.2636E+00 | −5.3883E−02 | 2.7364E−02 | −1.3918E−03 | 2.8716E−04 | −2.0452E−04 | −6.0614E−05 | 1.4937E−05 |
| R11 | 0.0000E+00 | 2.8549E−03 | 4.8494E−03 | 6.9039E−05 | −6.3437E−05 | −8.7274E−07 | 5.3680E−07 | 1.0348E−08 |
| R12 | −1.8961E+01 | −3.3728E−02 | 7.2026E−03 | −1.3390E−03 | 9.6401E−05 | 2.0178E−06 | −1.4709E−07 | −1.7314E−08 |

The relevant optical data of the imaging lens assembly LA in the second embodiment and the values defined in the aforesaid conditions (1) to (6) are shown in TABLE 5 as provided in the subsequent paragraphs. As can be seen in TABLE 5, the imaging lens assembly LA in the second embodiment satisfies the aforesaid conditions (1) to (6).

Figure 7:
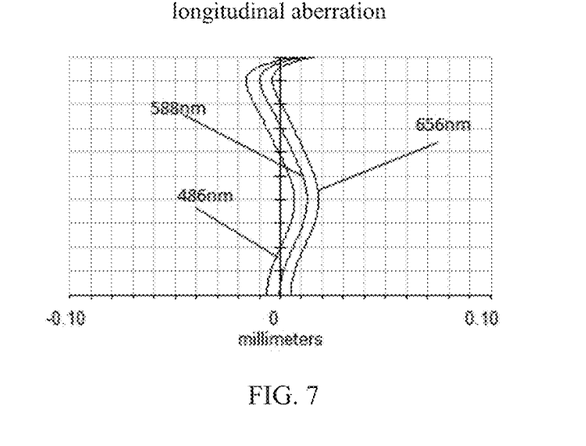
FIG. 7 is the longitudinal aberration of the imaging lens assembly of FIG. 6.
Figure 8:
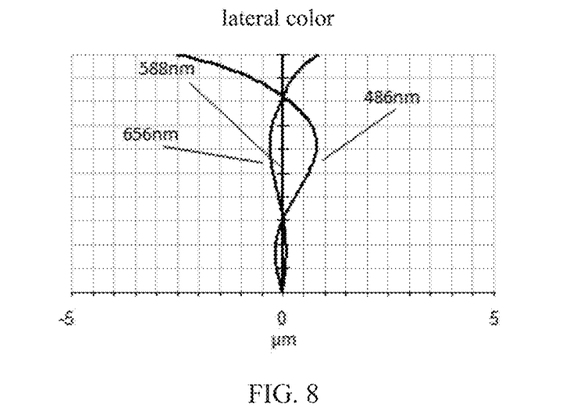
FIG. 8 is the lateral color of the imaging lens assembly of FIG. 6.
Figure 9:
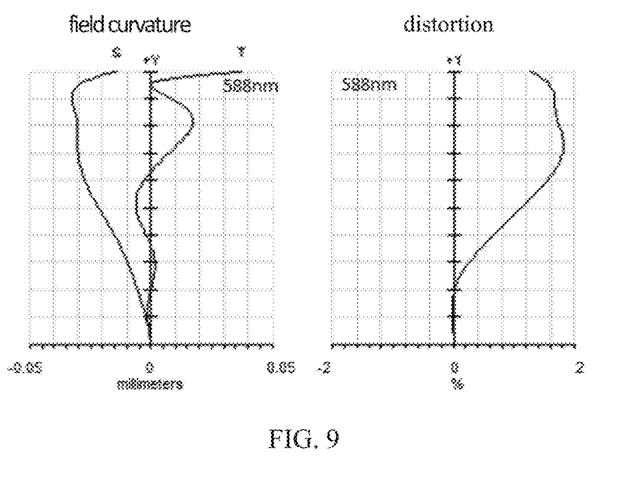
FIG. 9 is the field curvature and distortion of the imaging lens assembly of FIG. 6.

FIGS. 7-9 schematically illustrate the longitudinal aberration, the lateral color, the field curvature and distortion of the imaging lens assembly LA in the second embodiment respectively. In FIG. 9, curve S represents the field curvature related to the sagittal plane, and curve T represents the field curvature related to the tangential plane.

As can be seen, in the second embodiment, the view angle 2ω of the imaging lens assembly LA is 79.6°, the proportion value TTL/IH of the imaging lens assembly LA is 1.412, and the F number is 2.05. In other words, the imaging lens assembly LA as provided in the second embodiment has an ultrathin profile and a wide view angle with high luminous flux, and accordingly has good optical characteristics.

TABLE 5 shows the values of the imaging lens assembly LA in relevant to the conditions (1) to (6) according to both the first embodiment and the second embodiment. Moreover, in TABLE 5, the unit of the value 2ω is degree (°), and the units of the values f, f1, f2, f3, f4, f5, f6, TTL, LB and IH are millimeter (mm).

TABLE 5

| | Embodiment 1 | Embodiment 2 | Formulae |
|---|---|---|---|
| f1/f | 0.80 | 0.79 | Formula (1) |
| f3/f | −8.17 | −8.03 | Formula (2) |
| f5/f | 0.78 | 0.78 | Formula (3) |
| (R3 + R4)/(R3 − R4) | 2.76 | 2.74 | Formula (4) |
| (R5 + R6)/(R5 − R6) | −3.75 | −3.47 | Formula (5) |
| d2/d3 | −3.00 | −3.00 | Formula (6) |
| Fno | 2.05 | 2.05 | |
| 2ω | 79.7 | 79.6 | |
| TTL/IH | 1.414 | 1.412 | |
| f | 4.063 | 4.062 | |
| f1 | 3.233 | 3.228 | |
| f2 | −5.605 | −5.602 | |
| f3 | −33.190 | −32.615 | |
| f4 | 10.776 | 10.771 | |
| f5 | 3.171 | 3.170 | |
| f6 | −2.340 | −2.342 | |
| TTL | 4.847 | 4.840 | |
| LB | 1.044 | 1.042 | |
| IH | 3.428 | 3.428 | |

In summary, the imaging lens assembly LA as provided in the present disclosure has good optical characteristic, high luminous flux as well as an ultra-thin profile, and moreover, the imaging lens assembly LA satisfies the following parameter requirements: TTL/IH≤1.45, view angle 2ω≥76°, and Fno≤2.2. Therefore, the imaging lens assembly LA is applicable to a digital camera of a mobile phone or a WEB camera, which uses CCD imaging components or CMOS imaging components with high resolution.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens assembly, comprising:
   a first lens with positive refractive power;
   a second lens with negative refractive power;
   a third lens with negative refractive power;
   a fourth lens with positive refractive power;
   a fifth lens with positive refractive power; and
   a sixth lens with negative refractive power;
   wherein the first lens, the second lens, the third lens, the fourth lens, the fifth lens and the sixth lens are arranged in sequence from the object side to the image side, and satisfy the following conditions (1) to (5):

$$0.74 \leq f1/f \leq 0.85 \quad (1)$$

$$-10.00 \leq f3/f \leq -5.00 \quad (2)$$

$$0.50 \leq f5/f \leq 0.85 \quad (3)$$

$$2.20 \leq (R3+R4)/(R3-R4) \leq 5.00 \quad (4)$$

$$-7.00 \leq (R5+R6)/(R5-R6) \leq -2.00 \quad (5)$$

wherein f is the focal length of the imaging lens assembly; f1 is the focal length of the first lens; f3 is the focal length of the third lens; f5 is the focal length of the fifth lens; R3 is the curvature radius of the object side of the second lens; R4 is the curvature radius of the image side of the second lens; R5 is the curvature radius of the object side of the third lens; and R6 is the curvature radius of the image side of the third lens.

2. The imaging lens assembly of claim 1, further satisfying the following condition (6):

$$-5.00 \leq d2/d3 \leq -1.00 \quad (6)$$

wherein d2 is the axial distance between the image side of the first lens and the aperture stop, and d3 is the axial distance between the aperture stop to the object side of the second lens.

* * * * *